3,442,266
INTRA-UTERINE CONTRACEPTIVE DEVICE
Ota Krejčí, Danuše Krejčí, and Zdeněk Trávníček,
 Varnsdorf, and Jan Dvořák, Brno, Czechoslovakia,
 assignors to Vyzkumny Ustav Pletarsky, Brno,
 Czechoslovakia
Filed Feb. 13, 1967, Ser. No. 615,697
Claims priority, application Czechoslovakia, Feb. 11, 1966,
896/66
Int. Cl. A61f 5/46
U.S. Cl. 128—130                                    9 Claims

ABSTRACT OF THE DISCLOSURE

Two annular portions of physiologically inert filamentary synthetic plastic material are tangentially connected, and at least the material of one of these portions is stretch-drawn so as to be molecularly oriented.

BACKGROUND OF THE INVENTION

In recent years a variety of intra-uterine contraceptive devices has become known, all of them in form of a spiral or a loop and they consist generally of polyethylene. Since devices of this type are, as indicated by their name, introduced into the uterus, and further since movement of the devices after introduction sometimes occurs, it is customary to add to the polyethylene material a quantity of barium sulphate which makes it easier to determine the location of the device under X-ray examination.

Although intra-uterine devices of this type have been found to be highly effective in preventing conception, it has not yet been fully established on what factor this effectiveness is based. The most commonly accepted theory in the field holds that the device irritates the interoceptors in the endometrium of the uterus, thereby preventing the fertilized ovum from adhering to the lining of the uterus.

A disadvantage which is common to all the intra-uterine devices known to date is the fact that they are not capable of producing uniform irritation of the interoceptors throughout the uterus, particularly in view of the fact that the size of the uterine cavity differs from individual to individual. Attempts have been made to overcome this by providing the known devices in a variety of sizes. However, these sizes must necessarily be standardized and thus still do not take into account specific individual differences. This is undesirable because, as is well known, if the device used is too small, it will cause only insufficient irritation and will not be properly effective whereas, if the device is to large, it will produce too much irritation resulting in bleeding, pain, inflammation of the endometrium and either necessitating removal of the device or triggering its expulsion as a result of contractions of the uterus.

Another disadvantage of known intra-uterine contraceptive devices is the fact that they are all configurated to irritate only the interoceptors within the actual cavity of the uterus but not those located in the inner wall constituting the neck of the uterus. Since it is believed that the interoceptors are not uniformly distributed, but are primarily located on the inner side edges of the uterine cavity as well as in the wall constituting the neck of the uterus, maximum contraceptive action can be obtained only, if the intra-uterine device irritates the interoceptors not only in the cavity itself, but also those in the wall surrounding the neck of the uterus. None of the known devices of this type is capable of doing so.

Furthermore, special instruments are needed for introducing the known devices into the uterus, and for extracting them therefrom, thus requiring not only additional investments in these instruments but also requiring that the device be inserted by a highly skilled individual, for instance a gynaecologist.

Also, known intra-uterine contraceptive devices, which are usually manufactured by injection moulding, have an isotropic structure so that their strength, elasticity, resilience and mechanical memory are relatively low.

SUMMARY OF THE INVENTION

The present invention overcomes the above-mentioned disadvantages of the prior art.

More particularly, the present invention provides an intra-uterine contraceptive device of the non-occlusive character having greater strength, elasticity, resilience and mechanical memory than known devices of this type.

The device in accordance with the present invention is capable of providing controlled irritation of the interoceptors both in the uterine cavity and in the neck of the uterus.

Because of its anisotropic character, the novel device can be made in a single size which is suitable for all applications without, however, risking any danger of excessive irritation.

In accordance with one feature of our invention we provide an intra-uterine contraceptive device which comprises a pair of integral annular portions arranged in tangential relationship and each consisting of filamentary plastic material. The material of at least one of these portions is, in accordance with the invention, molecularly oriented.

Advantageously, the novel device consists of a drawn filamentary material having a cross-sectional diameter of between 0.25 and 2.5 mm.

The device according to the present invention comprises, as mentioned above, two annular portions, that is two loops or circles which may be of identical or different sizes. When introduced into the uterus, the device acts along a line which represents the maximum concentration of interoceptors in the uterus. It has been found that the contraceptive effect of an intra-uterine device is a function of the number of interoceptors on which pressure is exerted, as well as the specific pressure which the device exerts. If the combined effects of the interoceptors on which pressure is being exerted, and of the specific pressure created by the device is below a certain threshold value, then no contraceptive effect is created. If, on the other hand, the combined effects exceed a certain threshold, then pain and bleeding will result.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
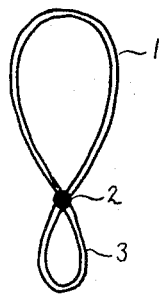
FIG. 1 is a somewhat schematic view of an intra-uterine contraceptive device in accordance with the present invention.
Figure 7:
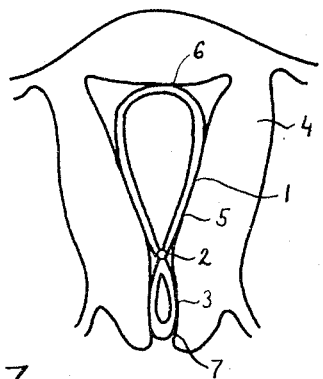
FIG. 7 is a schematic showing of a device according to the present invention inserted into an uterus.

Discussing now the drawing in detail, and firstly FIG. 1 thereof it will be seen that the device illustrated there consists of two closed loops 1 and 3 which in this embodiment are assumed to be made from coarse polycaproimide monofilament having a cross-sectional diameter of 1.5 mm. The larger loop 1 is adapted to be located within the uterine cavity and contacts (see FIG. 7) the inner side edges 5 of the uterus 4 as well as the fundus uteri 6. The smaller or cervical loop 3 is located in the neck 7 of the uterus and remains there. FIG. 1 clearly shows that at the point when the monofilament crosses, thus forming the two loops 1 and 3, the overlying portions of the filament are joined as indicated by reference numeral 2. Any well known means of establishing such a joint is suitable.

The total pressure exerted by the larger or uterine loop 1 is thus evenly distributed and the specific pressure is very low. The cervical loop 3 increases the contraceptive effect by acting upon the interoceptors located in the wall which constitutes the neck of the uterus and also reduces the suction of the os uteri. Furthermore, the cervical loop 3 serves to maintain the uterine loop 1 in its proper position within the uterine cavity and signals possible shifts in the position of the contraceptive device. Evidently, if the cervical loop 3 projects from the os uteri, this will be noticed, thereby giving an indication that the device is not in proper position for performing its function.

Figure 2:
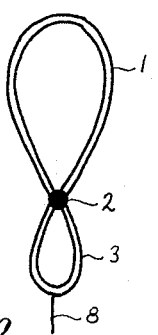
FIG. 2 is a view similar to FIG. 1, and showing the device illustrated in FIG. 1, but with an indicator thread attached to the device.

FIG. 2 shows an intra-uterine device substantially similar to that of FIG. 1, but differing from the same in that there is attached to the cervical loop 3 a synthetic indicator thread 8 of physiologically inert material and of a contrasting color, for instance black. This thread is intended to be visible in the vagina and serves as an aid in removing the device.

Figure 3:
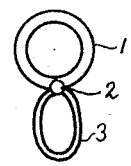
FIG. 3 shows an injection moulded blank representing an initial manufacturing step in the production of the novel device.

FIG. 3 shows an injection moulded intra-uterine device in accordance with the present invention and consisting of the uterine loop 1, the cervical loop 3, and the joint 2 which have all been shown in FIGS. 1 and 2. The material of the device is a high-polymeric substance and after completion of the injection moulding the molecules of the material are arranged in random manner. Thus, the material is isotropic and lacks molecular orientation, thus not possessing the required high tenacity, elasticity and resilience.

Figure 4:
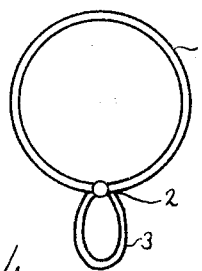
FIG. 4 shows the finished device obtained from the blank shown in FIG. 3.

FIG. 4 shows how the material constituting the uterine loop 1 can be provided with these properties by stretch-drawing the loop 1. As indicated in FIG. 4, the size of loop 1 is thereby enlarged, for instance by a factor of three, whereby the macromolecules of the material of the loop 1 become oriented. Thus, this material becomes anisotropic and has the same properties and behavior as extruded and stretch-drawn coarse monofilaments from the same linear fiber-forming high-polymeric material. In the embodiment of FIGS. 3 and 4 it is assumed that the cervical loop 3 remains isotropic, that is that it will not be subjected to stretch-drawing.

Figure 5:
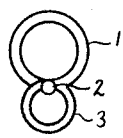
FIG. 5 shows a further injection moulded blank, generally similar to FIG. 3, but differently proportioned.
Figure 6:
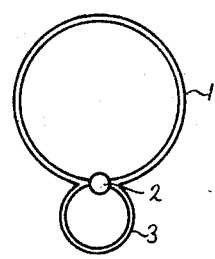
FIG. 6 shows the finished device obtained from the blank shown in FIG. 5.

FIG. 5 again shows a blank which is generally similar to that of FIG. 3 but differs therefrom in outline. To produce from the blank of FIG. 5 a fully operative intrauterine contraceptive device in accordance with the present invention, both the loops 1 and 3 are to be stretch-drawn so that the device illustrated in FIG. 6 results. The loops 1 and 3 shown in FIG. 6, it will be understood, consist of highly oriented anisotropic material exhibiting the same characteristics as those of a similar artefact made from coarse synthetic monofilament which has been extruded and subsequently stretch-drawn to several times its original length.

The contraceptive device according to the present invention can be produced from a wide range of high-molecular plastomeric materials, e.g., from polyamides, polyesters, polyurethanes, polyacrylonitriles and from various copolymers. Other materials, such as polyformaldehydes, polycarbonates and, under certain circumstances, polyolefins, which melt at higher temperatures, can be used. These are, generally, synthetic polymeric substances which are inert in contact with organisms and tissues, which do not irritate the body tissues and which possess a good to excellent stability relative to degradation by tissue enzymes.

If a high-molecular synthetic material of anisotropic structure is used, e.g., in form of a stretch-drawn filamentary material, then the axial orientation of the macromolecules imparts to the material the required high tenacity, elasticity, resilience and improved mechanical memory.

The various materials mentioned above are, in accordance with the invention, to be used in form of stretch-drawn filamentary structures having a cross-sectional diameter of 0.25 to 2.5 mm. and under these conditions give optimum properties as outlined earlier. The manufacture by means of extruders, followed by a stretch-drawing process, as in the manufacture of synthetic fibers, guarantees the necessary anisotropy and macromolecular orientation. However, the devices herein disclosed can also be made by injection moulding with subsequent stretch-drawing of the entire resulting blank, or of one of the loops thereof. Stretch-drawing is well known and need not be further described, it being evident that it can for instance be accomplished by inserting a split pin into the loop to be drawn and moving the segments of the pin radially.

An important advantage of the device in accordance with the present invention is its ease of insertion and removal resulting from its shape and elasticity in introducing the device into the uterus. It is simply deformed and inserted without any need for special instruments or for dilation of the os uteri. Also, administering of anaesthetics is not necessary. This is particularly important if the device is to be used in countries having a lack of skilled personnel, such as doctors in general or gynaecologists in particular, since a nurse or a midwife can perform the insertion as well as the withdrawal, for which purpose it is simply necessary to grasp the indicator thread and withdrawing the device.

Another advantage of the novel device resides in the fact that the uterine loop automatically adjusts to the individual form and shape as well as, to a certain extent, to the size of the uterus, this being due to the inherent properties of the anisotropic material.

The necessary pre-use sterilization of the device can be accomplished in any known manner, for instance by chemical treatment, by irradiation, by steaming or by boiling in water. The latter is an important advantage over the known devices of synthetic materials, having low softening and/or melting points, such as polyethylene, which cannot be so treated because they would become deformed.

It will be understood that each of the elements described above, or two or more together, may also find a useful application in other types of intra-uterine devices differing from the types described above.

While the invention has been illustrated and described as embodied in an intra-uterine device of the nonocclusive type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A device of the character described, comprising a pair of integral annular portions arranged in tangential relationship, each of said portions consisting of physiologically inert synthetic plastic filamentary material, and the material of at least one of said portions being molecularly oriented.

2. A device as defined in claim 1, wherein said portions are of identical configuration.

3. A device as defined in claim 1, wherein said portions are of non-identical configuration.

4. A device as defined in claim 1, wherein said portions are circumferentially complete.

5. A device as defined in claim 1, wherein the other of said portions is also molecularly oriented.

6. A device as defined in claim 1, wherein at least the material of said one portion is anisotropic.

7. A device as defined in claim 1, and further comprising an indicator thread depending from one of said portions.

8. A method of making an intra-uterine contraceptive device of the non-occulsive type, comprising the steps of providing a length of physiologically inert synthetic plastic filamentary material forming a pair of integral annular portions arranged tangentially with reference to one another; and molecularly orienting the material of at least one of said portions so that such material is anisotropic.

9. A method as defined in claim 8, wherein the step of molecularly orienting said material comprises stretch-drawing the material.

References Cited

UNITED STATES PATENTS

| | | | |
|---|---|---|---|
| 3,200,815 | 8/1965 | Margulies | 128—130 |
| 3,253,590 | 5/1966 | Birnberg et al. | 128—130 |

ADELE M. EAGER, *Primary Examiner.*